(12) United States Patent
Culver (10) Patent No.: US 6,300,938 B1
(45) Date of Patent: Oct. 9, 2001

(54) MULTIPLE-CYLINDER CONTROL DEVICE FOR COMPUTERS AND OTHER ELECTRONIC APPARATUS

(75) Inventor: Craig F. Culver, Woodside, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/291,582

(22) Filed: Apr. 12, 1999

Related U.S. Application Data

(60) Provisional application No. 60/081,426, filed on Apr. 13, 1998.

(51) Int. Cl.[7] .................................................. G09G 5/00
(52) U.S. Cl. .......................................... 345/156; 345/184
(58) Field of Search .................................. 345/157, 156, 345/145, 164, 167, 184

(56) References Cited

U.S. PATENT DOCUMENTS

| 4,131,033 | 12/1978 | Wright et al. ........................... 74/553 |
| 4,560,983 | 12/1985 | Williams ............................... 340/825 |
| 4,692,756 | 9/1987 | Clark ..................................... 340/709 |
| 4,706,294 | 11/1987 | Ouchida ............................... 381/109 |
| 4,712,101 | 12/1987 | Culver .................................. 340/710 |
| 4,724,715 | 2/1988 | Culver .................................... 74/471 |
| 4,767,923 | 8/1988 | Yuasa .................................... 250/221 |
| 4,782,327 | 11/1988 | Kley et al. ......................... 430/365 P |
| 4,795,296 | 1/1989 | Jau ........................................... 414/5 |
| 4,868,549 | 9/1989 | Affinito et al. ..................... 340/710 |
| 4,896,554 | 1/1990 | Culver .................................... 74/471 |
| 4,935,728 | 6/1990 | Kley ..................................... 340/709 |

(List continued on next page.)

FOREIGN PATENT DOCUMENTS

| 0265011A1 | 4/1988 | (EP) . |
| 0626634A2 | 11/1994 | (EP) . |
| WO97/31333 | 8/1997 | (WO) . |

OTHER PUBLICATIONS

Howe, Robert D., "Task Performance with a Dextrous Teleoperated Hand System," Proceedings of SPIE, Nov. 1992, vol. 1833, pp. 1–9.

Ellis, R.E. et al., "Design and Evaluation of a High–Performance Prototype Planar Haptic Interface," ASME Dec. 3, 1993, DSC–vol. 49, pp. 55–64.

Minsky, Margaret et al., "Feeling and Seeing: Issues in Force Display," ACM 1990, pp. 235–242.

Gotow, J.K., et al., "Perception of Mechanical Properties at the Man–Machine Interface," IEEE 1987, pp. 688–689.

Wiker, Steven F. et al., "Development of Tactile Mice for Blind Access to Computers: Importance of Stimulation Locus, Object Size, and Vibrotactile Display Resolution," Proceedings of the Human Factors Society 35th Annual Meeting 1991, pp. 708–712.

(List continued on next page.)

Primary Examiner—Richard Hjerpe
Assistant Examiner—Ronald Laneau
(74) Attorney, Agent, or Firm—James R. Riegel; Guy V. Tucker (57) ABSTRACT

A control device including a support and multiple cylinders. A first cylinder may be rotated and translated, and a first sensor senses the rotation of the first cylinder and outputs a first control signal representative of the rotation. A second cylinder is positioned parallel to the first cylinder and also may be rotated and translated. A second sensor senses the translation of the first cylinder and outputs a second control signal representative of that translation. Optionally, a third sensor can sense the independent rotation of the second cylinder and can output a second control signal representative of the rotation, and/or a fourth sensor may be used to sense translation similarly for the second cylinder. The first and said second cylinders provide a greater number of contact points for the user than a single cylinder and thus greater stability and accuracy when controlling a cursor or other entity. Additional embodiments include force feedback by coupling one or more actuators to one or both cylinders and outputting forces in one or more degrees of freedom of the cylinders.

33 Claims, 5 Drawing Sheets

U.S. PATENT DOCUMENTS

| | | | |
|---|---|---|---|
| 4,949,119 | 8/1990 | Moncrief et al. | 364/578 |
| 4,982,618 | 1/1991 | Culver | 74/471 XY |
| 4,983,901 | 1/1991 | Lehmer | 318/685 |
| 5,044,956 | 9/1991 | Behensky et al. | 434/45 |
| 5,086,296 | 2/1992 | Clark | 340/709 |
| 5,095,303 | 3/1992 | Clark et al. | 340/710 |
| 5,185,561 | 2/1993 | Good et al. | 318/432 |
| 5,204,600 | 4/1993 | Kahkoska | 318/602 |
| 5,235,868 | 8/1993 | Culver | 74/471 XY |
| 5,296,871 | 3/1994 | Paley | 345/163 |
| 5,313,230 | 5/1994 | Venolia et al. | 345/163 |
| 5,317,336 | 5/1994 | Hall | 345/164 |
| 5,381,080 | 1/1995 | Schnell et al. | 318/566 |
| 5,457,479 | 10/1995 | Cheng | 345/163 |
| 5,473,344 | 12/1995 | Bacon et al. | 345/163 |
| 5,477,237 | 12/1995 | Parks | 345/156 |
| 5,530,455 | 6/1996 | Gillick et al. | 345/163 |
| 5,542,672 | 8/1996 | Meredith | 463/37 |
| 5,566,087 * | 10/1996 | Voigt et al. | 345/166 |
| 5,587,937 | 12/1996 | Massie et al. | 364/578 |
| 5,589,828 | 12/1996 | Armstrong | 341/20 |
| 5,666,138 | 9/1997 | Culver | 345/161 |
| 5,666,473 | 9/1997 | Wallace | 345/420 |
| 5,691,747 * | 11/1997 | Amano | 345/156 |
| 5,709,219 | 1/1998 | Chen et al. | 128/782 |
| 5,734,373 | 3/1998 | Rosenberg et al. | 345/161 |
| 5,742,278 | 4/1998 | Chen et al. | 345/156 |
| 5,781,172 | 7/1998 | Engel et al. | 345/164 |
| 5,784,052 | 7/1998 | Keyson | 345/167 |
| 5,808,568 | 9/1998 | Wu | 341/20 |
| 5,821,921 | 10/1998 | Osborn et al. | 345/157 |
| 5,841,423 | 11/1998 | Carroll, Jr. et al. | 345/168 |
| 5,841,428 | 11/1998 | Jaeger et al. | 345/184 |
| 5,944,151 | 8/1999 | Jakobs et al. | 188/267.1 |
| 5,956,016 | 9/1999 | Kuenzner et al. | 345/156 |
| 6,031,518 * | 2/2000 | Adams et al. | 345/167 |
| 6,097,372 * | 8/2000 | Suzuki | 345/167 |
| 6,128,006 | 10/2000 | Rosenberg et al. | 345/163 |
| 6,154,201 | 11/2000 | Levin et al. | 345/184 |
| 6,184,868 | 2/2001 | Shahoian et al. | 345/161 |

OTHER PUBLICATIONS

Akamatsu, M. et al., "Multimodal Mouse: A Mouse–Type Device with Tactile and Force Display," Presence, vol. 3, No. 1, 1994, pp. 73–80.

Ramstein, C., "Combining Haptic and Braille Technologies: Design Issues and Pilot Study," Assets '96, $2^{nd}$ Annual ACM Conf. on Assistive Technologies, 1996, pp. 37–44.

Hannaford, B. et al., "Force–Feedback Cursor Control," NASA Tech Brief, vol. 13, No. 11, Item #21, 1989, pp. i, 1–4.

* cited by examiner

MULTIPLE-CYLINDER CONTROL DEVICE FOR COMPUTERS AND OTHER ELECTRONIC APPARATUS

CROSS REFERENCE TO RELATED APPLICATIONS

This application claims priority of provisional application Ser. No. 60/081,426, filed Apr. 13, 1998 by Craig F. Culver, entitled "Multiple Cylinder Pointer-Selector Control," assigned to the assignee of the present application, and which is incorporated herein by reference.

BACKGROUND OF THE INVENTION

This invention relates generally to control interface devices, and more particularly to control interface devices for providing input to a computer system for manipulating an environment implemented by the computer system.

Control devices can be used for a variety of different control tasks. A user can conveniently select or operate different functions and features of a device using the control device. The control device preferably offers a more intuitive and easy-to-use way of interfacing with a device than using other inconvenient, bulky, or unintuitive controls.

Control devices can be implemented in a variety of forms. Those available control devices used for providing input to computer systems and other electronic apparatuses can take many forms. For example, when providing input to a graphical user interface implemented by a computer, such as to control a cursor, control devices such as mice and trackballs are often used. A mouse, however, has some disadvantages in that its operation requires a relatively large, flat workspace and the full use of a user's hand. This can be particularly disadvantageous for portable devices such as laptop computers. Trackballs do not require the large workspace of a mouse, but often are large, bulky devices that are not easy to integrate into the housing of a portable device.

Other control devices have also been developed for providing input to a computer system to control a cursor or otherwise manipulate a computer-implemented environment. One such device is a cylindrical, rotatable input device as described in U.S. Pat. Nos. 4,712,101; 4,724,715; and 4,823,634 of C. Culver which allows a user to accurately control a cursor with an intuitive and compact design. A cylinder is translated in one degree of freedom to provide input in one degree of freedom, e.g. to move a cursor horizontally. The cylinder is rotated about its lengthwise axis to provide input in a different degree of freedom, e.g. to move a cursor vertically. The cylinder can be simply pressed downward to provide the equivalent of a button press on a mouse. The use of such a cylindrical control has advantages over trackpads, since they tend to offer a more intuitive interaction for the user when manipulating a graphical object and also offer the possibility of providing force feedback to the user with actuators coupled to the cylinder, something which a trackpad cannot do.

A problem with control device designs such as the cylindrical control described above is that even the compact design of such devices can be too large for many portable devices. For example, the thinness of input devices has become a key criterion in portable computers and other mobile electronic equipment. The "trackpads" which sense finger position have become common on portable computers and are typically furnished in thicknesses of approximately 4 mm but can be reduced to a 2 mm thickness. The cylindrical controls described above, in contrast, are typically about 7 mm in diameter and can be reduced in size to approximately 5 mm. When cylinder diameter is reduced much below about 4 mm, operation begins to suffer as frictional fingertip coupling with the cylinder's surface is reduced. Some users complain that the control is difficult to engage.

A further problem with the cylindrical controls used in the prior art is that they are capable of controlling input for only two axes of motion or degrees of freedom. An additional problem is that these cylinder devices suffer from instability when designed for single-contact point-and-click operation. For example, downward pressure closes a switch connected to the cylinder, which performs a mouse-click operation. However, the instability causes unwanted "cursor creep" to occur, i.e. a small amount of rotation of the cylinder is caused when the cylinder is depressed, causing the cursor to move slightly in an undesired fashion.

There is therefore a need for cylinder control devices having a smaller thickness and greater stability to allow accurate input to a computer system or other device.

SUMMARY OF THE INVENTION

The present invention provides a multiple-cylinder control device that is compact and allows a user to interface with a computer or other electronic apparatus in an effective manner. The control device can also be provided with force feedback for added functionality.

More particularly, a control device of the present invention includes first and second cylinders oriented in parallel, each cylinder operative to rotate in a rotary degree of freedom and translate in a linear degree of freedom parallel to the axis of rotation. A first sensor detects the rotational motion of one or more of the cylinders and outputs a first control signal. A second sensor senses the translation of at least one of the cylinders and outputs a second control signal. The first and said second cylinders can be rotated and translated by a finger of a user. Various embodiments include cylinders that can be rotated independently with respect to each other or in conjunction, and which can be translated independently of each other or in conjunction. A third sensor can be used to independently sense rotation of the second cylinder and/or a fourth sensor can be used to sense independent translation of the cylinders. Three or more cylinders can be provided similarly in other embodiments. One or more contact bars oriented parallel to the cylinders can provide an additional contact point for the user's finger when the user moves the cylinders. A microprocessor coupled to the sensors receives the control signals and processes the signals.

The control device can be connected to a host computer, for example, and provide the control signals to the computer for controlling a cursor or other entity implemented and displayed by the computer. Preferably, the rotation of the cylinder(s) is used for vertical (Y-axis) motion of a cursor, and the translation of the cylinder(s) is used for horizontal (X-axis) motion of the cursor. The control signals can be processed in different ways as desired by the receiving device. For example, the rotational signals from each of the cylinders can be compared and the signal from the slower-moving cylinder can be discarded. Alternatively, the two rotational signals can be added together. The signals for translation of the cylinders can similarly be processed as desired. A switch can be used to provide a switch signal when either of the cylinders is pressed downward, e.g. when the user wishes to input the equivalent of a mouse click.

In a different embodiment, the multiple-cylinder control includes at least one actuator for providing force feedback to one or both cylinders. The computer can provide force feedback command signals which cause forces to be output in the degrees of freedom of one or more of the cylinders. For example, an actuator can be provided for each degree of freedom of each cylinder; or a single actuator can provide forces in both degrees of freedom of a cylinder. Both active and passive actuators can be used. A local microprocessor can calculate and/or process forces locally based on force feedback commands from the host computer. The force feedback signals or commands from the host computer can be based at least in part on the first sensor signal and the second sensor signal. For example, the force feedback can be determined based on the interaction of a cursor with other graphical objects in a graphical user interface.

The device and method of the present invention provide a compact interface control device to a computer or other electronic apparatus that provides greater control functionality and convenience for the user than other interface devices. The multiple cylinders provide multiple contact points for a user's finger and thus greater stability and accuracy than one-cylinder control devices or trackballs. This also allows the control device to be made smaller and flatter, which is ideal for portable electronic devices. Tactile and force feedback may also be added to the control device to provide the user with greater control and to inform the user of options and selections through the sense of touch.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1A:
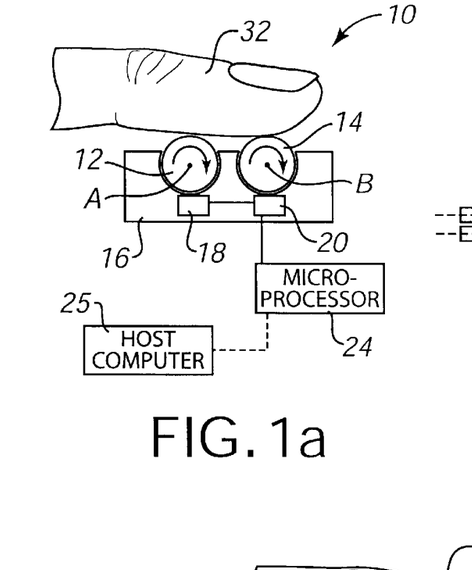
FIGS. 1a and 1b are side and top views of a multiple-cylinder control device of the present invention.
Figure 1B:
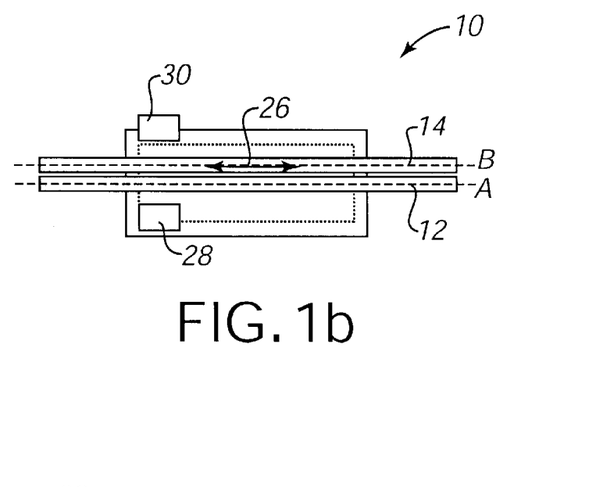

FIGS. 1a and 1b are side elevational and top plan views, respectively, of a dual-cylinder control device 10 of the present invention. Two parallel cylinders 12 and 14 are rotatably coupled to a support 16 which is preferably grounded. Cylinder 12 preferably can be rotated clockwise or counterclockwise about axis A, and cylinder 14 can preferably be rotated clockwise or counterclockwise about axis B. The support 16 can include Teflon bearings or bearings made of other material to hold the cylinders. The cylinders are preferably spaced a close distance to each other, such as 3–5 mm, but this distance can be varied depending on how large a contact area is desired.

A sensor 18, such as an encoder, can be positioned to detect rotational motion of cylinder 12, and a sensor 20, such as an encoder, can be positioned to detect rotational motion of cylinder 14. The encoders read optical patterns printed on the cylinders as described with reference to FIG. 4. Alternatively, other types of sensors can be used. For example, rotational cylinder motion can be sensed by a shaft encoder coupled at the end of a cylinder. Sensors such as analog potentiometers, magnetic sensors, optical sensors (e.g. photodiode or photoresistor), or other type of sensors can be used, and can be relative sensors or absolute sensors. In one type of optical encoder that can be used, optical fibers are used to conduct received light pulses to a set of photodetectors. Optical fibers or other molded channels are well suited to the device 10 due to the flexibility of the fibers, allowing the fibers to be routed from a moving optical pickup point (in the swinging arm) to a fixed photodetector location in a compact space. Such optical channel encoders are described in greater detail in application Ser. No. 09/204, 641, incorporated herein by reference.

Cylinders 12 and 14 can also each be translated (moved linearly) along axis A and axis B, respectively, as indicated by arrow 26. Sensor 28 can be positioned to detect translational motion of cylinder 12, and encoder 30 can be positioned to detect translational motion of cylinder 14. The signals from encoders 28 and 30 can be provided to microprocessor 24. Cylinders 12 and 14 can be rotated and translated independently from each other. A finger 32 or hand of a user can be used to rotate and/or translate either or both cylinders as the user desires to provide input signals to a computer system, as described in greater detail below.

A microprocessor 24 preferably receives the signals from the encoders 18 and 20 and can process the signals and/or update a computer environment in response to motion of the cylinders 12 and 14. Alternatively, hardwired digital logic can perform basic functions instead of the microprocessor. For example, in one embodiment, microprocessor 24 is included in a host computer 25 which displays a computer-generated environment on a display device with one or more application programs running on the host. The host computer directly receives the inputs from the sensors 18–30 to manipulate the application program and/or computer environment. In other embodiments, microprocessor 24 can be local to the control device 10 and can be connected to a separate host computer 25 having its own microprocessor. Microprocessor 24 receives the signals from the sensors and can provide them to the host computer after processing, for example. One or more application programs running on the host computer 25 implement a computer generated environment and receive the input signals from the microprocessor 24. In any of the embodiments disclosed herein, the host computer can be a personal computer, workstation, video game console, or other computing or display device, set top box, "network-computer", etc.

The control device 10 can be physically coupled to the host computer 25, or the device 10 can be physically remote from the computer 25 and communicate with the computer using signals transferred through wires, cables, wireless transmitter/receiver, etc.

Figure 2:
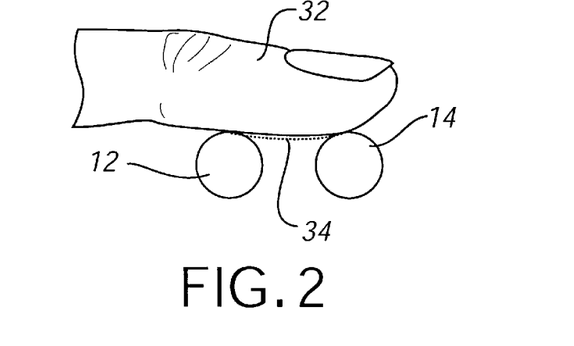
FIG. 2 is a side view of the cylinders of FIGS. 1a and 1b and a finger contacting such.

FIG. 2 is a side (end) view of the two cylinders 12 and 14 and a fingertip 32 contacting both cylinders. The finger 32 is free to move across the cylinders, causing them to rotate and providing control of a first value; similarly, the finger can push the cylinders to the left or right along their axes, to provide control of a second value. If the cylinders are sized and spaced correctly, the user tends to perceive not two separate contact points, but something closer to a complete surface, whose boundaries are defined by the two actual contact points. Dotted line 34 indicates this "virtual surface."

In control devices using small-diameter cylinders, this design significantly improves actual finger coupling because it doubles the actual contact surface compared with a single cylinder of the same diameter. The multiple-cylinder design also improves perceived finger coupling because of a well-known tactile perception phenomenon in which the fingertip's sensing of the edges of a keytop plays a major role in the user's perception of the keytop's surface. By sensing only two contact points, the user believes that an entire surface is being contacted; the user is fooled into believing there is an actual surface between the two contact points. In the dual-cylinder control, the two thin cylinder contact points have a feel similar to that of the edges of a concave keytop. The brain tends to "fill in" the missing surface area between the two edges. While the fingertip really only feels the two ends of the dotted line (the tops of the two cylinders 12 and 14), an illusion is created that a surface exists along the dotted line.

Since it feels to the user that a larger surface is being contacted, the diameters of the cylinders can be made very small. This is advantageous for inclusion of the control device 10 in portable electronic devices such as portable computers. With the greater stability offered by multiple cylinders, the control device can be made of very small thickness, small enough to rival the thinnest of alternate input technologies such as trackpads.

Of course, the actual finger coupling with each small diameter cylinder is reduced when compared with larger-diameter cylinders. Thus, in embodiments having very small diameter cylinders, the risk of slippage may be higher. The cylinders can be provided with texturing or other gripping features to improve the grip of the finger on the cylinders. It is also important that the cylinders be carried in low-friction bearings to prevent undesirable slippage.

Figure 3:
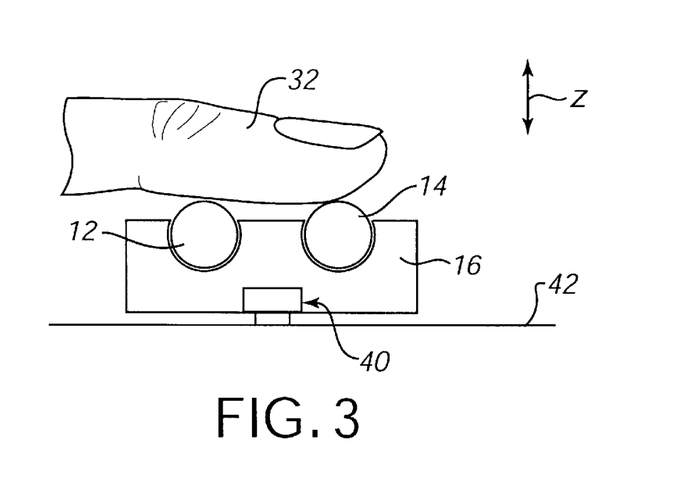
FIG. 3 is a side view of the control device of FIGS. 1a and 1b including a contact switch.

FIG. 3 is a side view of a portion of control device 10 illustrating the button click feature of the present invention. As disclosed in U.S. Pat. Nos. 4,712,101; 4,724,715; and 4,823,634 of C. Culver, incorporated herein by reference, the support carrying a cylinder may include a switch which is actuated by downward pressure upon the cylinder. As shown in FIG. 3, finger 32 may press down on cylinder 12 and/or cylinder 14 to cause the support 16 to move downward and actuate switch 40 on a grounded surface 42. This provides an input to the microprocessor 24 which can be equivalent to a button click on a mouse, for example.

The two contact points of control device 10 add to the stability of controlling the device. The two contact points produce a kind of "saddle" between the cylinders across which the fingers can rest. This is inherently more stable than contacting a single point on one cylinder, since the finger is supported at two points. The stability allows the user to control a cursor or other object with greater accuracy. In addition, this significantly reduces stability control problems such as unwanted "cursor creep" which can be a problem with single cylinder control devices when pressing down on a cylinder to provide a button input. The frictional coupling between the adjacent surfaces of the cylinders and the skin of the fingertip helps to stabilize the control during the act of pressing down. This tends to "lock" the cylinders against inadvertent movement during the downward-pressing act, thus reducing the likelihood of inadvertent cylinder rotation and cursor motion. This allows a single fingertip to perform point-and-click computer operations with ease.

Furthermore, the cylinder 12 and/or 14 can be rotated or translated while the cylinder is being pressed down (activating the switch 40) to allow "dragging" of graphical objects such as windows and icons within the GUI. Switch 40 can be implemented as other types of switches in other embodiments, for example an optical switch (for example, as described in co-pending application Ser. No. 09/204,641), magnetic switch, or other type of switch.

The switch 40 can also provide an "indexing" function, where if the switch is activated, one or more input signals from the translation and/or rotation of the cylinder is not provided to the host computer or ignored by the host computer. While the switch is activated (or toggled), the user can reposition the cylinder to a position allowing a desired range of motion, at which point the indexing mode is turned off. This can be useful if a controlled cursor is desired to be moved further in a direction but the cylinder has reached a limit of motion (e.g., in the translatory degree of freedom). Indexing is the equivalent of a user picking up a mouse and repositioning it without providing input to the host while the mouse is moved, and is described in greater detail in U.S. Pat. No. 5,825,308, incorporated herein by reference.

Switch 40 can be a two-state switch or other type of sensor. For example, switch 40 can be a pressure sensor that sensed the amount of pressure the user is exerting downward on the device 10, where the amount of pressure is provided as a third input to the computer system. Such a third input can be used to control a variety of operations in a computer environment, such as indexing, which might only be provided if a pressure over a particular threshold is detected. Pressure information can also be used to modify output forces in the force feedback embodiments described below, as described in greater detail in co-pending application Ser. No. 08/881,691, incorporated herein by reference. If a sensor having a larger sensed range of motion is used, such as a potentiometer or optical encoder, then a third input can be provided to a computer system indicating the amount of z-axis movement of the support 16.

Figure 4:
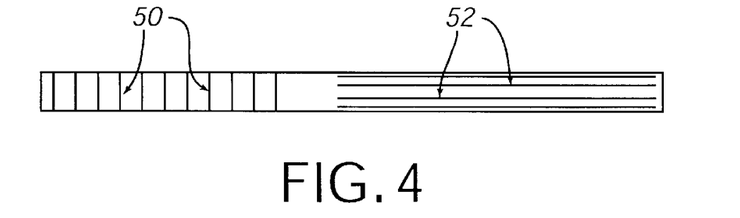
FIG. 4 is a top view of a cylinder of the device of FIG. 1 including optical patterns for sensing purposes.

FIG. 4 is a top plan view of one example of an optical encoding pattern printed on a cylinder 12 and/or 14 which can be used to sense the motion of the cylinder(s). Pattern 50 includes a number of stripes oriented perpendicular to the axis of rotation of the cylinder, each stripe extending at least partially around the circumference of the cylinder. Pattern 50 is used to sense translational movement of the cylinder, such that when the cylinder is translated, one or more stripes move past the encoder 18 or 20 as detected by light reflected from the pattern, and the amount of movement can be ascertained. The operation of such optical encoder sensing is well known to those skilled in the art. Pattern 50 preferably is printed on only a portion of the cylinder.

Pattern 52 is printed on a different portion of the cylinder from pattern 50 and includes a number of stripes oriented parallel to the axis of rotation of the cylinder. Preferably, the pattern 52 extends about the entire circumference of the cylinder. When the cylinder is rotated, one or more stripes rotate past the encoder 28 or 30 as detected by light reflected from the pattern, and the amount of rotation can be ascertained. The operation of such optical encoder sensing is well known to those skilled in the art. In other embodiments, other patterns may be printed on the cylinders or can be printed on a sliding support carrying the cylinders or oriented parallel to the cylinders. Furthermore, in different embodiments, other sensing schemes can be used as described in U.S. Pat. Nos. 4,712,101; 4,724,715; and 4,823, 634. In yet other embodiments, a compound sensor including the ability to sense two or more different degrees of freedom can be used, as is well known to those skilled in the art. For example, the patterns 50 and 52 can be combined into a single grid pattern printed on at least a portion of the cylinder. The compound sensor can sense both the rotational motion of one set of stripes and the translational motion of the other set of stripes.

Figure 5A:
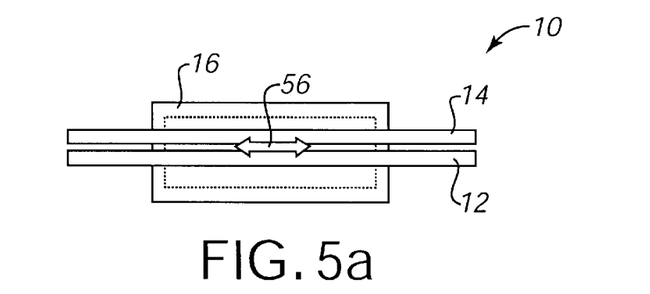
FIGS. 5a and 5b are top plan views of two different control schemes for the control device of FIG. 1.
Figure 5B:
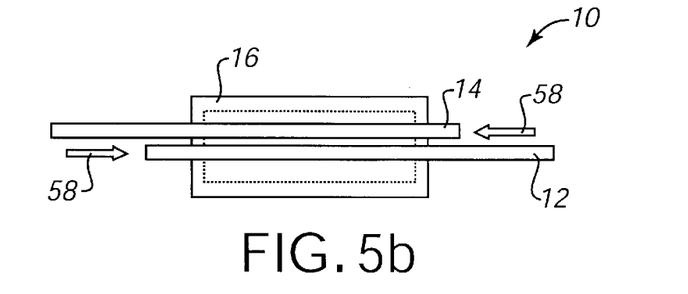

FIGS. 5a and 5b illustrate two different control schemes using the control device 10 of the present invention. In FIG. 5a, a two- or three-axis control scheme is presented. The two cylinders 12 and 14 can be physically coupled together such that they are translated as a single unit, as indicated by arrow 56. Each cylinder 12 and 14 may be rotated independently. Thus, a single translatory degree of freedom and two rotational degrees of freedom provide a three-axis control, i.e. three separate input values to a computer or other electronic device. To sense the translatory motion, only one sensor is required; e.g., the pattern 50 need only be printed on one of the cylinders.

The use of the input signals from the control device 10 is dependent on the operation of the device. Typically, software interprets the input signals or values to control various operations on the computer system, such as cursor movement. As an example, when the control software is providing two-dimensional cursor control (such as standard computer mouse input), the encoder microprocessor 24 detects the horizontal (X) motion from the appropriate optical pattern when the two coupled cylinders are translated by the user. For vertical (Y) sensing, each rotation sensor provides a separate sensor signal to the microprocessor 24. The microprocessor 24 can be a dedicated sensor microprocessor that sends the X and Y signals to a host computer processor (e.g. after any required processing); or the microprocessor 24 can be a host computer microprocessor that processes and uses the X and Y input signals.

In one embodiment, when both cylinders are rotating at the same time and at the same velocity, as would be the case when a fingertip is firmly rolling across both cylinders, the encoder microprocessor 24 counts the Y pulses from each encoder 18 and 20, but ignores one set of pulses. If one cylinder stops rotating, or begins to turn slower than the other cylinder (i.e., has a smaller velocity, indicated as having moved less in a particular time interval), the processor 24 uses only the sensor signal from the faster-moving cylinder as the Y input. Thus if the velocity of one cylinder relative to the other is greater, that cylinder's input signal is used. This can occur, for example, when a finger moves across both cylinders and begins losing its grip on one of the cylinders, allowing that cylinder to slow or stop. Using this method, a Y signal is output to the computer as long as either of the two cylinders is turning. Alternatively, other criteria can be examined to determine if either signal should be ignored. For example, the signal from the cylinder having the smaller acceleration can be ignored.

The computer may alternatively wish to receive three-axis control signals from the control device 10. For example, the computer can be providing a three-dimensional environment and the three signals indicate movement of a cursor or user-controlled entity along X, Y, and Z axes. In such an embodiment, the translational motion of the cylinders can provide horizontal (X) input signals, front cylinder 14 can provide vertical (Y) input signals, and the rear cylinder 12 can provide depth (Z) signals. Other configurations can also be used, e.g. the cylinder motion can control cursor in different axes. Alternatively, the translational motion and one cylinder rotation can provide motion in two dimensions while the other cylinder's rotation can provide control over a different changeable value, such as volume, velocity, etc.

Furthermore, the microprocessor 24 (or other connected microprocessor) can change the desired control scheme to a more applicable one by applying control inputs to different parameters and applications. Software running on microprocessor 24 can decide to ignore one or more of the signals or to treat them in particular ways. The device's microprocessor can independently control both outputs of each cylinder's rotary and longitudinal motions (in a two-cylinder control device, $X_a$, $X_b$; $Y_a$ $Y_b$).

For example, a typical computer application might be primarily 2-dimensional, requiring mouse-type X and Y cursor control. The control device can be configured, either by the user or by an application running on a host computer or on microprocessor 24, to provide two-axis output. The motion of either cylinder 12 or 14 can generate appropriate X and Y output signals ($X_a$ or $X_b$=X; $Y_a$ or $Y_b$=Y)

The microprocessor can handle the outputs in several ways. If the signals from both cylinders are treated as additive, then $X_a+X_b$=2X. This would cause a controlled cursor to move twice as fast across a display screen of a host computer. Alternatively, the signals can be treated as comparative; for example, the signal from the slower-moving cylinder can be ignored: if $X_a$ is 0 and $X_b$ is 1, output is 1X; if $X_a$ is 1 and $X_b$ is 0, output is 1X. In some applications the additive approach may be preferable because it can provide a natural and intuitive way of allowing the user to switch between two speeds: when rapid cursor movement is desired, both cylinders are moved. When slower movement is appropriate, only one cylinder is moved. In other applications the output can be single-speed, and comparative encoding is employed: the faster-moving cylinder's output would be sensed and the slower (or motionless) cylinder's output is ignored.

FIG. 5b illustrates a four-axis control scheme. Cylinder 12 and cylinder 14 can be translated independently with respect to each other, as indicated by arrows 58. For example, horizontal (X) and vertical (Y) axes can be controlled by rotating and translating one cylinder 14, while depth (Z) axis and another value N can be controlled by rotating and translating the other cylinder 12.

Figure 6A:
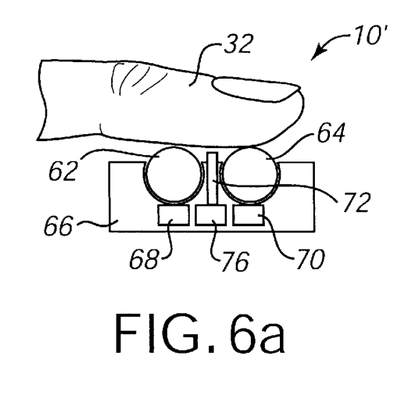
FIGS. 6a and 6b are side and top views of an alternate embodiment of the control device of the present invention including a contact bar provided adjacent to the cylinders.
Figure 6B:
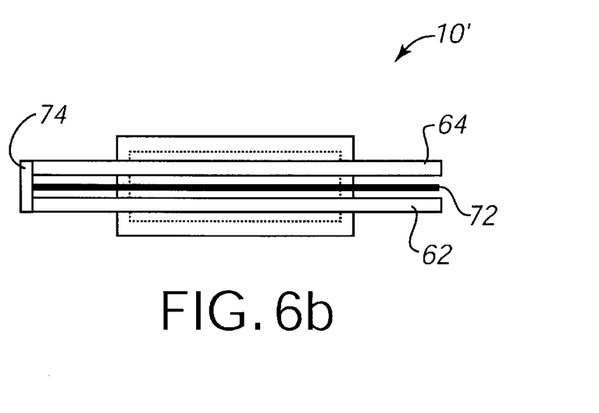

FIGS. 6a and 6b are side elevational and top plan views, respectively, of an alternate embodiment 10' of the control device 10. Control device 10' includes a cylinder 62, a cylinder 64, a support 66, an encoder 68, and an encoder 70. These components function similarly to like components in device 10 of FIG. 1. Furthermore, device 10' includes a bar 72 positioned between the cylinders 62 and 64. The bar 72 provides additional surface contact for the user's finger so that the user has even greater stability when moving the cylinders and pressing the cylinders downward for a button press. The bar 72 is preferably coupled to both of the cylinders by a link 74 or other coupling member and thus translates with the cylinders (in a 4-axis embodiment, the bar 72 can be coupled to only one cylinder). Since the bar 72 moves with one or both cylinders, it can be provided with an encoding pattern similar to pattern 50 shown in FIG. 4, e.g. on its bottom surface. An encoder 76 can be provided to sense the translation of the bar 72 by emitting a beam of electromagnetic energy (e.g. infrared light) onto the pattern and receiving the reflected beam. In such an embodiment, the pattern 50 need not be printed on one or both cylinders 62 and 64 since translational motion is sensed using the bar 72.

In other embodiments, the bar 72 can be positioned at other areas relative to the cylinders 62 and 64, such as on either side of the cylinders. In addition, multiple bars can be provided on all sides of the cylinders to provide additional finger contact points for the user.

Figure 7:
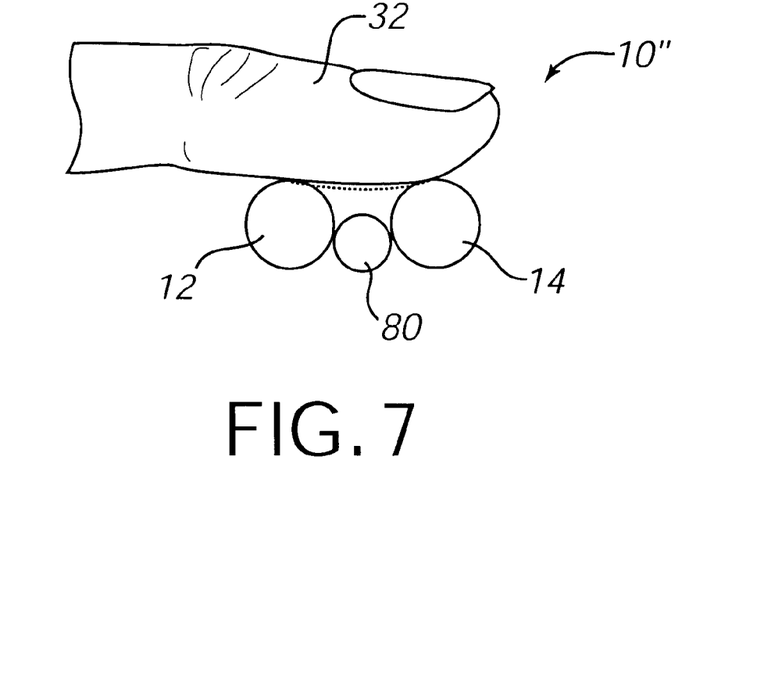
FIG. 7 is a side view of an alternate embodiment of the control device of the present invention including a link between the cylinders causing concurrent rotation of the cylinders.

FIG. 7 is a side elevational view of the cylinders of the present invention in an alternate embodiment 10". In this embodiment, the two cylinders 12 and 14 are mechanically linked so that both cylinders always rotate in tandem. In the described embodiment, the cylinders 12 and 14 are linked by a roller idler 80 or gear. The idler 80 frictionally engages each of the cylinders so that when either cylinder 12 or cylinder 14 is rotated by the user, the other cylinder must also rotate in the same direction. Low-friction bearings are preferably used for the cylinders to minimize frictional resistance to rotation of the cylinders.

In this embodiment, the rotation of only one of the cylinders need be sensed by encoder 18 or 20, although both may be sensed if desired to determine if there is any slippage occurring. Thus, only one sensor 18 or 20 is required. Alternatively, a shaft sensor (such as an optical encoder) can be coupled to the idler 80 instead of the cylinders 12 and 14 to sense rotation of the idler, which represents the rotation of either cylinder 12 and 14. These embodiments can be used for conventional 2-axis input to a computer device, similar to a standard computer mouse, where translation provides input for one axis and rotation provides input for the other axis.

The use of two closely-spaced parallel cylinders having positive linking as shown in FIG. 7 provides multiple advantages. Two contact points (one on each cylinder) are provided for the user, allowing greater stability and control and a tactile illusion of a large surface, as described above. Furthermore, the user has a greater intuitive feel for rotating the cylinders since both cylinders always rotate in conjunction. Disadvantages include a greater cost to manufacture than the embodiment 10 of FIG. 1 due to increased number of parts (such as idler 80).

Figure 8:
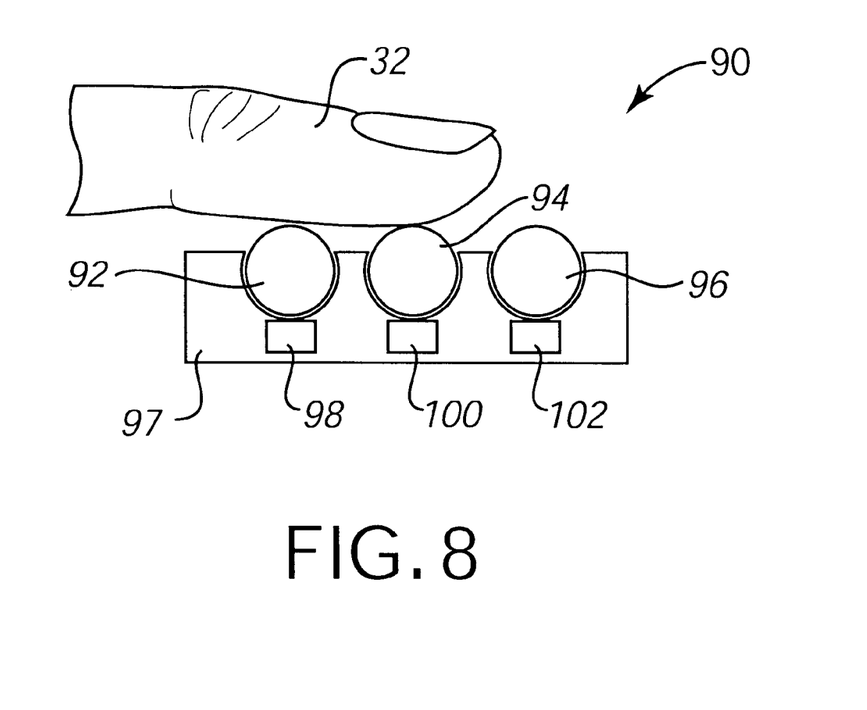
FIG. 8 is a side elevational view of an alternate embodiment of the control device of the present invention including three cylinders.

FIG. 8 is a side elevational view of an alternate embodiment 90 of the present invention that includes multiple cylinders. In the embodiment shown, three different cylinders 92, 94, and 96 are provided in a support 97 that is preferably grounded. Rotation of cylinder 92 is sensed by sensor 98, rotation of cylinder 94 is sensed by sensor 100, and rotation of cylinder 96 is sensed by sensor 102. The translation of each cylinder may also be sensed by an additional sensor for each cylinder, or by a single sensor if the cylinders are coupled together for translation. In some embodiments, two or more of the cylinders can be rotationally coupled together as well and sensed in tandem, as described with reference to FIG. 7. An advantage of having a greater number of cylinders is that a greater number of contact points is provided to the user, allowing greater stability and accuracy of control.

Figure 9A:
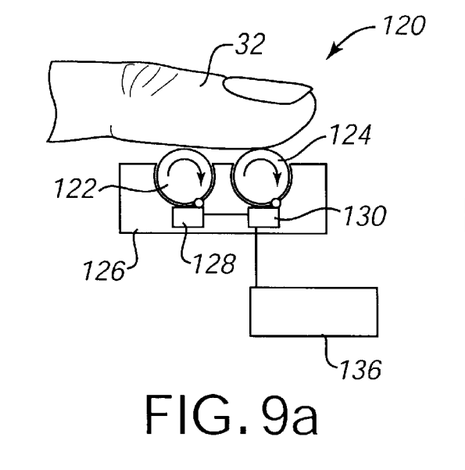
FIGS. 9a and 9b are side and top views of an alternate embodiment of the control device of the present invention including actuators for force feedback.
Figure 9B:
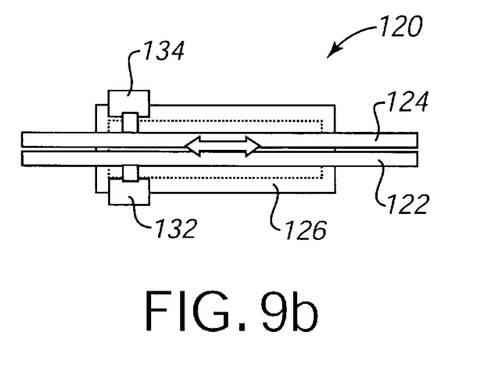

FIGS. 9a and 9b are side elevational and top plan views, respectively, of an embodiment 120 of the present invention including force feedback capability. The device can be provided with force-generating or force-altering actuators that can be controlled by a microprocessor or other controller. The actuators supply forces to the moving parts of the control device as a means of increasing speed and accuracy of control functions, for simulating forces acting on the control device, and/or for outputting a variety of different force sensations to the user. Implementations of force feedback and suitable control architectures are described in U.S. Pat. Nos. 4,823,634 and 5,235,868 and copending patent application Ser. No. 09/203,908 filed Dec. 1, 1998, all incorporated herein by reference.

Control device 120 includes a cylinder 122, a cylinder 124, and a support 126 within which the cylinders may be translated and rotated similar to the above embodiments. Device 120 also includes an actuator 128 for applying a force to cylinder 122 in the rotational degree of freedom of cylinder 122. An actuator 130 outputs a force to cylinder 124 in the rotational degree of freedom of cylinder 124. Sensors (not shown) for sensing rotational motion of the cylinders may be included with the actuators 128 and 130 or may be separate devices. An actuator 132 is provided to output a force on cylinder 122 in the translational degree of freedom of cylinder 122. An actuator 134 is provided to output a force on cylinder 124 in the translational degree of freedom of actuator 124. Since each actuator provides a force only a single degree of freedom of a cylinder, motion of the cylinder cannot be influenced in the other degree of freedom of the cylinder by that actuator. This allows great flexibility by a controlling host computer to control force feedback in particular degrees of freedom of each cylinder. For example, the cylinder can be positioned in a carrier that moves linearly, where the carrier is actuated in the linear degree of freedom. The carrier also carries an actuator that provides force to the cylinder in the rotational degree of freedom. Some other embodiments allowing independent control of force feedback in each degree of freedom are described with reference to U.S. Pat. No. 5,235,868 and also below with reference to FIGS. 11a and 11b.

Actuators 128, 130, 132, and 134 can be a variety of types. In the embodiment of FIGS. 9a and 9b, the actuators are servomotors or other type of active actuator which can output an active force on the cylinders based on received control signals, such as voice coil actuators, DC motors, linear current control motors, stepper motors, moving magnet actuators, hydraulic or pneumatic actuators, torquers, etc. Passive actuators may also be used, such as magnetic particle brakes, fluid controlled brakes (hydraulic or pneumatic) passive brakes, friction members, friction drive, electromagnetic coil wound about an ferrous core, etc. One passive actuator embodiment is described with reference to FIGS. 10a and 10b. Additional actuators may be provided and controlled by microprocessor 132 to produce other tactile sensations unrelated to the motion of the cylinders, such as a vibration, to one or both of the cylinders. Such a tactile sensation can be independently produced for each cylinder by using tactile sensation generators, such as an electromagnetic actuator with a spinning eccentric. Furthermore, a mechanical transmission can be provided between an actuator and a cylinder to amplify forces, such as a belt drive, capstan drive, gear assembly, or other mechanical transmission system.

Microprocessor 132 receives sensor signals from the sensors and outputs control signals to the actuators of the control device 120. The microprocessor can be local to the device 120 to process forces locally and can be commanded by a host computer coupled to the device. Various force sensations can be output such as damping forces, spring forces, vibration forces, texture forces, jolts, friction forces, etc. Force feedback implementations which can be provided in the present invention are described in greater detail in co-pending patent application Ser. No. 09/203,908 filed Dec. 1, 1998, and also described below.

In a dynamic linking embodiment, the actuators may be fitted to the control device for dynamically linking and unlinking the cylinders, so that the microprocessor can select whether the cylinders operate in tandem or independently. This can be accomplished with a mechanical link similar to that described in U.S. Pat. No. 5,235,868, in which portions of adjacent cylinders are provided with a toothed surface feature which allows them to mesh with rotary gears, forming a rack-and-pinion mechanism. The pinion meshed with its respective cylinder then rotates in unison with cylinder movement. A pair of pinions may be meshed with a pair of adjacent cylinders. If these pinions are then themselves joined by an electrical clutch, the clutch may be engaged to lock the two cylinders together in that direction.

Figure 10A:
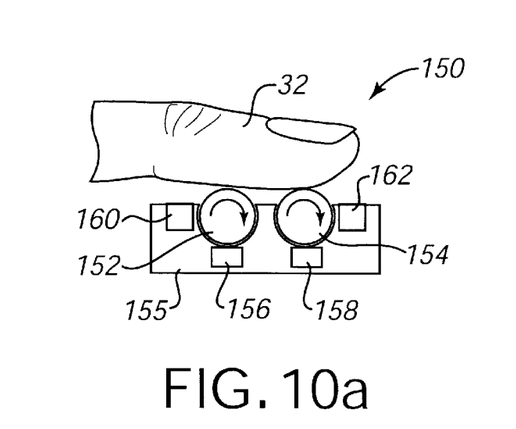
FIGS. 10a and 10b are side and top views of an alternate embodiment of the force feedback control device of FIGS. 9a and 9b.
Figure 10B:
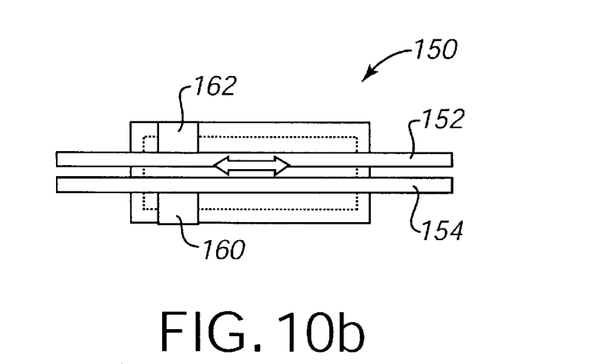

FIGS. 10a and 10b are side elevational and top plan views, respectively, of a second embodiment 150 of the present invention including force feedback capability. Cylinders 152 and 154 and support 155 are similar to those described with reference to FIGS. 9a and 9b, except that at least part of each cylinder is made of a ferrous alloy. Sensors 156 and 158 are similar to the sensors described in the embodiments above. Actuator 160 is an electromagnet coil brake positioned against the ferrous section of the cylinder 152. Similarly, actuator 162 is an electromagnetic coil brake positioned near the ferrous section of the cylinder 154. For example, a pole piece and a coil can be used. When the magnet is energized by flowing an electrical current therethrough, a magnetic field is produced from the coil of the brake and interacts with the ferrous material in the cylinder, causing the magnet to be moved to contact the cylinder.

When the brake is not energized, cylinder movement is free, the only drag being that inherently imposed by the support bushings. When the brake is energized, e.g. by a signal from a microprocessor (such as microprocessor 136) or control electronics, the magnet contacts and acts against the cylinder in the manner of a conventional electromagnetic brake or clutch, and cylinder movement is retarded, e.g. a resistive or drag force (braking action) is produced on the movement of the cylinder in both rotary and translatory degrees of freedom of the cylinder. Alternatively, separate passive brakes can be provided to control forces in a single degree of freedom of a cylinder, as described above with reference to FIGS. 9a and 9b. In addition, nonmagnetic forms of actuation can be used, such as piezo-ceramic, shape-memory alloys, etc.

The force feedback embodiments may be used to produce an interactive control whose motion is affected by a software application. Thus, for example, when a cursor is controlled to move within a graphical user interface by a user using the control device 120 or 150, the interactions of the cursor with other graphical objects (such as icons, pull down menus and menu items, windows, scroll bars, graphical buttons, sliders, links, etc.) can cause force feedback sensations to be output on the cylinder(s). Of course, force feedback can be provided with the control device of the present invention in other computer-implemented environments, such as a game, simulation, application program, drawing program, etc. Actuation can also be used to link or unlink the multiple cylinders so that they may be operated independently or are locked together in tandem, as desired by the software of the controlling microprocessor. For example, in the embodiment shown in FIG. 7 above, the idler 80 can be connected to a solenoid or actuator and can be commanded to be moved to an engaged position as shown in FIG. 7, or to a disengaged position away from the cylinders that allows each cylinder to rotate independently of the other.

Force sensations can be applied to the cylinders to enhance the interaction of the user with a computer generated environment. For example, one computer environment is a browser application program which allows a user of a host computer to interact with web pages and the like over the Internet. In Internet browsing convention, the user controlled cursor normally takes the form of an arrow image until it moves into either a screen image or a hypertext link on the screen, at which time it turns into a hand image. This software function is the visual indication to the user that the image under the cursor is a link, and that clicking the mouse will select the link to call up a different web page or download other data. With the force feedback interactive control device described above with reference to FIGS. 10a–b (or 9a–b), the computer can supply control signals back to the control device as required to cause the actuators to output forces on the cylinders. In this example, whenever the browser software on the host computer detects that the cursor has moved over a link and switches the image of the cursor from an arrow to a hand, that same detection can send a data signal out to the cylindrical control. For example, the browser application itself, or a host driver or other program running on the host can send out the signal to the control device 120 or 150. At the control device, the signal causes the electromagnetic brake (or other actuator) to apply a force to the appropriate cylinder. For example, a microprocessor local to the control device (microprocessor 136 can be used as such) can interpret the signal as a force feedback command and provide the necessary control signals to the actuators. Such a local processor embodiment that receives force feedback commands from the host is described in greater detail in U.S. Pat. No. 5,734,373. The result is that, when the arrow image of the cursor switches to a hand image, cylinder movement is braked or otherwise actuated. At his or her fingertips, the user feels the cursor's arrival at the link. Speed, accuracy, and ease-of-use of the control process are enhanced with this additional feedback.

Other cursor interactions can also cause force feedback. One or more cylinders can be braked whenever the cursor is moved to the edge of the screen, or whenever it reaches or enters a logical target such as a window, icon, etc. Furthermore, the electromagnetic brake may be modulated in various ways to provide more than just increased drag. It can be pulsed to supply a vibration force sensation to the user's hand whenever a particular action is performed on the screen. Jolt forces or bumps can be output on one or more cylinders when the controlled cursor moves over a particular object, such as an icon or window border. The control can add progressive decelerative drag as the cursor approaches a target, and it can sharply increase the drag if the cursor passes the target. Drag may be one-way to provide a ratcheting effect. For example, when the computer detects pointing-device movement in the wrong direction from what it believes is the logical target, it may apply braking. But when the cursor begins moving in a desirable direction, braking may decrease in proportion to the correctness of direction. Attractive forces (in active actuator embodiments) can assist the user in moving the cursor onto a target such as an icon, menu item, or link in a web page, and resist motion away from the target once the cursor has moved onto the target. Other forces include detents, spring forces, repulsive forces, textures, damping forces, other periodic forces, or obstruction forces. This type of force feedback is provided in a "position control" paradigm, where the position of the cursor (or other graphical object) corresponds with the position of a cylinder in its degrees of freedom. Such functionality is described in greater detail in co-pending patent application Ser. No. 08/571,606, incorporated herein by reference.

Alternatively, a rate control mapping can be provided between the cylinders and a controlled graphical object or entity, where the amount of movement away from an origin position indicates a magnitude of input. For example, an origin position of each cylinder can be designated. Force output from the actuators can provides resistance to motion of a cylinder away from the origin. For example, a spring force can be output that resists motion of the cylinder away from the origin position, where the greater the deviation from the origin, the greater the resistive force that biases the cylinder back to the origin. The amount of deviation from the origin is directly to proportional to a magnitude of input. Thus, if the user is controlling the velocity of a cursor, the greater amount the cylinder is moved from the origin, the faster the cursor is moved. The direction of the assembly from the origin controls the direction of the object or function. Functions such as motion, volume, velocity, or any parameter that can be changed can be controlled according to a rate control mapping. An obstruction force can be output to prevent or hinder the user from rotating the roller further in a direction. Other force sensations that can be applied to a rotatable control, such as a cylinder or knob, are described in copending patent application Ser. Nos. 09/179,382, filed Oct. 26, 1998, and Ser. No. 09/049,155, filed Mar. 26, 1998, both incorporated herein by reference. Furthermore, a rate control mapping and a position control mapping can both be used, as desired by the user and/or as selected by a host computer or other apparatus. Such dual functionality is described in greater detail in U.S. Pat. 5,825,308, incorporated herein by reference.

Figure 11A:
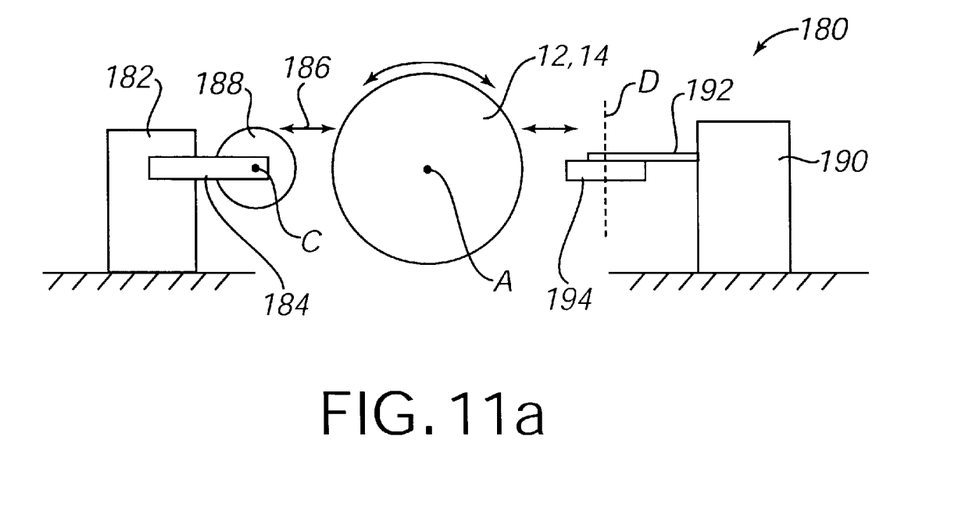
FIGS. 11a and 11b illustrate example embodiments of providing force feedback in single degrees of freedom of a cylinder of the present invention.

FIG. 11a is a side elevational view of an example embodiment 180 of a cylinder provided with independent actuation. To provide a braking (passive) force in the translatory degree of freedom, an actuator 182, such as a solenoid, voice coil actuator, etc., moves an arm member 184 in a linear degree of freedom as shown by arrow 186. A wheel 188 is rotatably coupled to the arm 184 and is oriented to rotate about an axis C which is parallel to the axis A of rotation of the cylinder. The actuator 182 can move the wheel 188 to engage the cylinder 12 or 14, which causes a braking force in the translational degree of freedom of the cylinder. However, the cylinder 12 or 14 may still rotate about axis A since wheel 188 is allowed to rotate about axis C.

Similarly, a braking force can be provided in rotational degree of freedom of the cylinder 12 or 14 by providing an actuator 190 coupled to an arm member 192 and wheel 194. Wheel 194 is rotatably coupled to arm 192 so that the wheel can rotate about an axis D perpendicular to the axis A of the cylinder. When the wheel 194 is moved to engage the cylinder by the actuator 190, a braking force is provided for the rotation of the cylinder. However, the cylinder may still translate along axis A since the wheel 194 is allowed to rotate about axis D. The wheels 188 and 194 can be positioned at various positions about the cylinder 12 or 14 as dictated by space considerations.

Figure 11B:
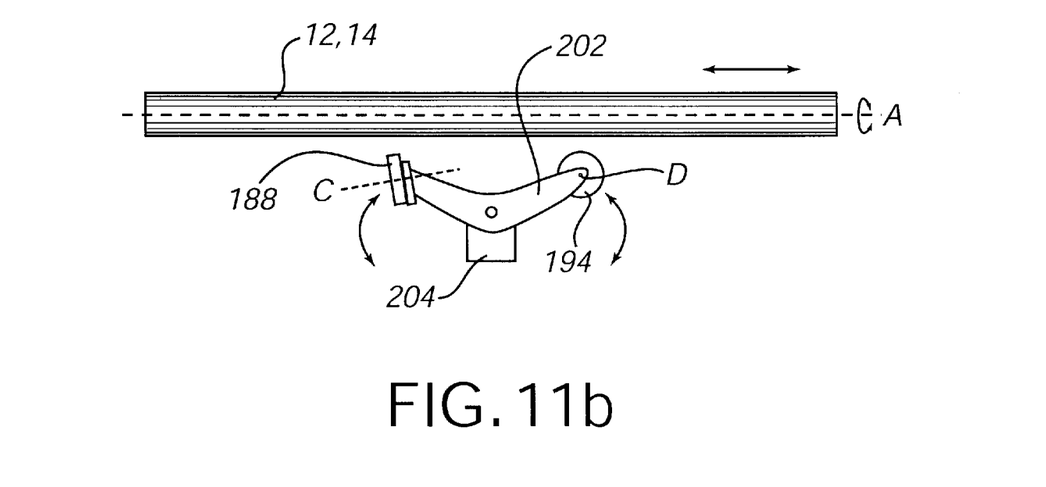

FIG. 11b is a top plan view of an alternate embodiment 200 of the embodiment of FIG. 11a. In this embodiment, wheel 188 and wheel 194 are positioned at ends of a pivoting member 202 which is coupled to an actuator 204. Actuator 204 can rotate the member 202 about axis E, which causes either wheel 188 or wheel 194 to engage the cylinder. If wheel 188 is engaged, only rotational motion of the cylinder is allowed, and if wheel 194 is engaged, only translatory motion is allowed. In some embodiments, the member 202 can be linearly moved toward the cylinder to engage both of the wheels 188 and 194 simultaneously. An advantage of this embodiment is that only one actuator is required.

While this invention has been described in terms of several preferred embodiments, there are alterations, modifications, and permutations thereof which fail within the scope of this invention. It should also be noted that the embodiments described above can be combined in various ways in a particular implementation. Furthermore, certain terminology has been used for the purposes of descriptive clarity, and not to limit the present invention. It is therefore intended that the following appended claims include such alterations, modifications, and permutations as fall within the true spirit and scope of the present invention.

What is claimed is:

1. A control device comprising:

a support;

a first cylinder coupled to said support and operative to rotate with respect to said support in a first rotary degree of freedom and to translate with respect to said support in a linear degree of freedom;

a second cylinder coupled to at least one of said support and said first cylinder and positioned parallel to said first cylinder, said second cylinder rotatable with respect to said support in a second rotary degree of freedom and to translate with respect to said support in said linear degree of freedom; and a first sensor coupled to at least one of said support, said first cylinder, and said second cylinder and operative to sense said rotation of at least one of said first cylinder and said second cylinder, said first sensor outputting a first control signal representative of said rotation;

a second sensor coupled to at least one of said support, said first cylinder, and said second cylinder and operative to sense said translation of at least one of said first cylinder and said second cylinder, said second sensor outputting a second control signal, wherein said first cylinder and said second cylinder can be rotated and translated by a finger or hand of a user.

2. A control device as recited in claim 1 wherein rotation of said first cylinder is independent of rotation of said second cylinder.

3. A control device as recited in claim 1 wherein said first cylinder and said second cylinder must be rotated in conjunction with each other.

4. A control device as recited in claim 1 wherein said translation of said first cylinder is independent of said translation of said second cylinder.

5. A control device as recited in claim 1 wherein said first cylinder and said second cylinder must be translated in conjunction with each other.

6. A control device as recited in claim 1 wherein said first sensor senses rotation of said first cylinder, and further comprising a third sensor coupled to at least one of said support and said cylinder and operative to sense said rotation of said second cylinder independently of said rotation of said first cylinder, said third sensor outputting a third control signal.

7. A control device as recited in claim 1 wherein said sensors are optical sensors which sense a pattern provided on at least one of said cylinders.

8. A control device as recited in claim 1 wherein said first and second sensors are integrated in a compound sensor.

9. A control device as recited in claim 6 wherein said second sensor senses translation of said first cylinder, and further comprising a fourth sensor coupled to said support and operative to sense said translation of said second cylinder independently of said translation of said first cylinder, said fourth sensor outputting a fourth control signal.

10. A control device as recited in claim 1 further comprising a first actuator coupled to said first cylinder and a second actuator coupled to said second cylinder, each of said actuators operative to output a force on said cylinder to which said actuator is coupled.

11. A control device as recited in claim 10 wherein said first and second actuators are active actuators.

12. A control device as recited in claim 10 wherein said first and second actuators are passive brakes.

13. A control device as recited in claim 1 further comprising a switch coupled to said support and providing a switch signal when either of said cylinders is pressed downward.

14. A control device as recited in claim 1 further comprising a moveable bar oriented parallel to said cylinders and providing an additional contact point for said user's finger when moving said cylinders.

15. A control device as recited in claim 1 further comprising a microprocessor coupled to said first, second, and third sensors that receives said first, second, and third control signals and processes said signals.

16. A force feedback control device in communication with a host computer implementing a graphical environment, the force feedback control device comprising:
a support;
a first cylinder coupled to said support and operative to rotate with respect to said support in a first rotary degree of freedom and to translate with respect to said support in a linear degree of freedom;
a first sensor coupled to at least one of said support and said first cylinder and operative to sense said rotation of said first cylinder, said first sensor outputting a first control signal representative of said rotation, wherein said host computer receives said representation of said rotation;
a second sensor coupled to at least one of said support and said first cylinder and operative to sense said translation of said first cylinder, said second sensor outputting a second control signal representative of said translation, wherein said host computer receives said representation of said translation;
a second cylinder coupled to said support and positioned parallel to said first cylinder, said second cylinder rotatable with respect to said support in a second rotary degree of freedom and to translate with respect to said support in said linear degree of freedom, wherein said first cylinder and said second cylinder can be simultaneously rotated by a finger or hand of a user and together provide two contact points for said user's finger or hand; and
an actuator coupled to one of said first and second cylinders, said actuator outputting a force on said cylinder to which it is coupled in response to a force feedback signal provided by said host computer.

17. A force feedback control device as recited in claim 16 wherein said actuator is a first actuator coupled to said first cylinder, and further comprising a second actuator coupled to said second cylinder, said second actuator outputting a force on said second cylinder in response to a second force feedback signal provided by said host computer.

18. A force feedback control device as recited in claim 16 further comprising a third sensor coupled to at least one of said support and said second cylinder, and operative to sense said rotation of said second cylinder, said second sensor outputting a second control signal.

19. A force feedback control device as recited in claim 17 further comprising a third actuator coupled to said first cylinder and a fourth actuator coupled to said second cylinder, wherein said first actuator outputs a first force in said rotational degree of freedom of said first cylinder, said second actuator outputs a second force in said rotational degree of freedom of said second cylinder, said third actuator outputs a third force in said translational degree of freedom of said first cylinder, and said fourth actuator outputs a fourth force in said translational degree of freedom of said second cylinder.

20. A force feedback control device as recited in claim 16 wherein said force on said first cylinder from said actuator is provided in both said rotational and said translational degrees of freedom of said first cylinder.

21. A force feedback control device as recited in claim 16 wherein said actuator is an active actuator.

22. A force feedback control device as recited in claim 16 wherein said actuator is a passive brake.

23. A force feedback control device as recited in claim 22 wherein said passive brake is an electromagnetic brake.

24. A force feedback control device as recited in claim 16 further comprising a microprocessor coupled to said first and second sensors that receives said first, second, and third control signals and processes said signals.

25. A method for interfacing with a computer using signals provided by a control device, the method comprising:
providing a first sensor signal from a first sensor to said computer, said first sensor signal being representative of a rotational position of a first cylinder of said control device in a first rotary degree of freedom, wherein said first cylinder is moved in said first rotary degree of freedom by a finger of a user;
providing a second sensor signal from a second sensor to said computer, said second sensor signal being representative of a translational position of said first cylinder of said control device in a translational degree of freedom, wherein said cylinder is moved in said translational degree of freedom by said finger of said user; and
providing a third sensor signal from a third sensor to said computer, said third sensor signal being representative of a rotational position of a second cylinder in a second rotary degree of freedom, said second cylinder positioned parallel to said first cylinder of said control device, wherein said second cylinder is moved in said second rotary degree of freedom by said finger of said user.

26. A method as recited in claim 25 wherein said computer compares said first sensor signal and said third sensor signal and uses only one of said first and third sensor signals as input to an application program.

27. A method as recited in claim 26 wherein either said first sensor signal or third sensor signal is used based on velocities of said first cylinder and said second cylinder, respectively, wherein said sensor signal associated with a faster moving cylinder is used.

28. A method as recited in claim 25 wherein said first sensor signal and said third sensor signal represent values that are added together by said computer and provided to control a motion of a user-controlled cursor.

29. A method as recited in claim 25 further comprising providing a fourth sensor signal from a fourth sensor to said computer, said fourth sensor signal being representative of a translational position of said second cylinder in a second translational degree of freedom, wherein said second cylinder is moved in said second translational degree of freedom by said finger of said user independently of said movement of said first cylinder in said first translational degree of freedom.

30. A method as recited in claim 25 further comprising receiving a force feedback signal from said computer and providing said force feedback signal to an actuator that is coupled to said first cylinder, said force feedback signal being based at least in part on said first sensor signal and said second sensor signal.

31. A method as recited in claim 30 wherein said actuator is a first actuator and said force feedback signal is a first force feedback signal, and further comprising receiving a second force feedback signal from said computer and providing said second force feedback signal to a second actuator that is coupled to said second cylinder, said second force feedback signal being based at least in part on said third sensor signal and said second sensor signal.

32. A method as recited in claim 25 wherein said computer includes a display screen and a user-controlled cursor is displayed on said display screen having a position determined by said first sensor signal and said second sensor signal.

33. A method as recited in claim 31 wherein said computer displays a graphical environment including at least one graphical object and a user controlled cursor, wherein said cursor is displayed in said graphical environment at a position determined at least in part by said first sensor signal and said second sensor signal, and wherein said first and second force feedback signals are determined at least in part based on an interaction of said cursor with said graphical object.

\* \* \* \* \*